(12) United States Patent
Maruyama et al.

(10) Patent No.: US 8,264,902 B2
(45) Date of Patent: Sep. 11, 2012

(54) MEMORY CONTROL METHOD AND MEMORY CONTROL DEVICE

(75) Inventors: Shizuko Maruyama, Kawasaki (JP); Nobukazu Koizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 208 days.

(21) Appl. No.: 12/749,029

(22) Filed: Mar. 29, 2010

(65) Prior Publication Data

US 2010/0284234 A1    Nov. 11, 2010

(30) Foreign Application Priority Data

May 8, 2009   (JP) ................................ 2009-113194

(51) Int. Cl.
*G11C 7/00* (2006.01)
(52) U.S. Cl. .............. 365/221; 365/189.15; 365/189.16; 365/189.17; 365/200
(58) Field of Classification Search .................. 365/200, 365/221, 189.15, 189.16, 189.14, 189.17
See application file for complete search history.

(56) References Cited

U.S. PATENT DOCUMENTS

| | | | |
|---|---|---|---|
| 6,956,577 B2 * | 10/2005 | Radke et al. ................... | 345/531 |
| 7,187,613 B2 * | 3/2007 | Yang ......................... | 365/230.03 |
| 7,257,688 B2 * | 8/2007 | Kurokawa et al. ............ | 711/157 |
| 7,274,611 B2 * | 9/2007 | Roohparvar .................. | 365/201 |
| 7,724,262 B2 * | 5/2010 | Radke ........................... | 345/536 |

FOREIGN PATENT DOCUMENTS

| | | |
|---|---|---|
| JP | 2002-278831 A | 9/2002 |
| JP | 2003-288268 A | 10/2003 |
| KR | 10-2008-0089622 | 10/2008 |

OTHER PUBLICATIONS

Korean Office Action dated Feb. 8, 2012, issued in corresponding Korean Patent Application No. 10-2010-30323.

* cited by examiner

*Primary Examiner* — Pho M Luu
(74) *Attorney, Agent, or Firm* — Westerman, Hattori, Daniels & Adrian, LLP

(57) ABSTRACT

A memory control method that carries out first-in first-out access control for a memory having a plurality of storage areas, including: selecting, as write positions, an address of a storage area in a storage block having at least one or more storage areas and an address of a storage area in any one of a plurality of redundant blocks that are made redundant with respect to the storage block and have at least one or more storage areas when the write positions are selected to write data to the memory; and selecting, as read positions, an address of a storage area of the storage block and an address selected by the selecting of the write position from among the addresses of a plurality of the redundant blocks when the read positions are selected to read data written by the writing of the data to the memory.

8 Claims, 9 Drawing Sheets

MEMORY CONTROL METHOD AND MEMORY CONTROL DEVICE

CROSS-REFERENCE TO RELATED APPLICATIONS

This application is based upon and claims the benefit of priority of the prior Japanese Patent Application No. 2009-113194, filed on May 8, 2009, the entire contents of which are incorporated herein by reference.

FIELD

The present invention relates to access control for memory.

BACKGROUND

FIFO (First In, First Out) has been well known as a method of controlling a RAM (Random Access Memory). The following describes the FIFO access control for RAM. FIG. 8 schematically illustrates the FIFO access control.

As illustrated in FIG. 8, according to the FIFO access control, initially, a first to a tenth data items are written in that order to addresses 0 to 9 of the RAM. Then, before the written data items are overwritten, the first to tenth data items are read. After that, the first to tenth data items are written in that order.

The following describes access timing of the FIFO access control. FIG. 9 illustrates control timings for a conventional RAM. Incidentally, the intervals at which data is written to one address are 20 clocks in FIG. 9. Moreover, it takes one clock to read data from each address; data is successively read out.

As illustrated in FIG. 9, each time "write enable" is input to the RAM at intervals of 20 clocks, a write pointer sequentially points at addresses 0 to 9 of the RAM and 10 data items are written to addresses 0 to 9. During the operation, it takes 20 clocks to write one data item, meaning that it takes 200 clocks to write data items to addresses 0 to 9. Moreover, the reading of the written data items is performed locally after a data item is written to the last address 9 of the RAM. During the operation, it takes one clock to read out one data item, meaning that it takes 10 clocks to read out data items from addresses 0 to 9. Incidentally, a read pointer points to the top address from which data is read. Therefore, when "read enable" is not input to the RAM, the read pointer remains at address 0.

However, the problem is that according to the above way of FIFO access control, the period during which data may be read, or readable period, is short. After pointing at the last address 9, the write pointer points at the first address 0. Then, data is overwritten. Accordingly, data needs to be read after data is written to the last address 9 and before data is written to the first address 0.

To address the problem that the readable period is short, another way of access control is well known: parts of RAM's addresses are used as redundant blocks. FIG. 10 is a diagram schematically illustrating access control with parts of RAM's addresses used as redundant blocks. Incidentally, in FIG. 10, there are two more addresses compared with the RAM illustrated in FIG. 8. However, suppose that 10 data items are written to the RAM. FIG. 11 illustrates access control timings when parts of RAM's addresses are used as redundant blocks.

As illustrated in FIG. 10, according to the access control with redundant blocks used, first, 10 data items are sequentially written to addresses 0 to 9 among 12 addresses. Then, the written 10 data items are read. After that, 10 data items are sequentially written to addresses 10, 11 and 0 to 7. That is, blocks of two addresses following the address to which the tenth data item has been written are left as redundant blocks in any case. In this manner, redundant blocks are set for data to be read or written, thereby extending the period from when the tenth data item is written until the next data item overwrites the first data item. More specifically, as illustrated in FIG. 11, the readable period is extended by an amount equivalent to the number of addresses made redundant, compared with the above way of access control.

The following describes a configuration related to the access control with redundant blocks used. FIG. 12 illustrates a control configuration for a RAM where parts of addresses are used as redundant blocks.

As illustrated in FIG. 12, provided to control the RAM are a write enable generation section, a write address generation section, a read enable generation section, and a read address generation section. In the RAM, as described above, storage areas 0 to 11 are provided, each storage area having a capacity of 10 bits. Moreover, provided around the RAM are a 10-bit flip-flop that temporarily holds write data; and a 10-bit flip-flop that temporarily holds read data.

The write enable generation section generates a 1-bit "write enable" for the RAM. Between the write enable generation section and the RAM, a 1-bit flip-flop is provided to temporarily hold the "write enable." The write address generation section generates, as a write pointer for the RAM, a 4-bit write address. Between the write address generation section and the RAM, a 4-bit flip-flop is provided to temporarily hold the write address. The read enable generation section generates a 1-bit "read enable" for the RAM. Between the read enable generation section and the RAM, a 1-bit flip-flop is provided to temporarily hold the "read enable." The read address generation section generates, as a read pointer for the RAM, a 4-bit read address. Between the read address generation section and the RAM, a 4-bit flip-flop is provided to temporarily hold the read address.

The following describes the operation of the read address generation section. FIG. 13 illustrates the operation of a conventional read address generation section.

As illustrated in FIG. 13, first, the read address generation section makes a determination as to whether "pre read enable," which is "read enable" that is generated by the read enable generation section and has yet to be input into the RAM, is 1 (S901).

When the "pre read enable" is 1 (S901, YES), the read address generation section makes a determination as to whether a read address is 11 (S902).

When the read address is 11 (S902, YES), the read address generation section assigns 0 to "read address next," which is a read address that has yet to be held by a flip-flop (S903).

On the other hand, when the read address is not 11 (S902, NO), the read address generation section assigns a value obtained by adding one and the read address to the "read address next" (S904).

In that manner, according to the conventional control method by which parts of RAM's addresses are used as redundant blocks, the "read address next" is counted up every time data is read out.

[Patent Document 1] Japanese Laid-open Patent Publication No. 2002-278831

[Patent Document 2] Japanese Laid-open Patent Publication No. 2003-288268

However, according to the above way of access control that uses redundant blocks, since the "read address next" is changed each time data is read, there is no correlation between the RAM's addresses and the order of data items to be written. Therefore, the flip-flop that temporarily holds the read address needs to continuously hold the read address. Thus the problem is that the flip-flop may not be used as a flip-flop that holds the other operations' values.

SUMMARY

According to an aspect of the present invention, the memory control method including: selecting, as write positions, an address of a storage area in a storage block having at least one or more storage areas and an address of a storage area in any one of a plurality of redundant blocks that are made redundant with respect to the storage block and have at least one or more storage areas when the write positions are selected to write data to a memory; and selecting, as read positions, an address of a storage area of the storage block and an address selected by the selecting of the write position from among the addresses of a plurality of the redundant blocks when the read positions are selected to read data written by the writing of the data to the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment of the present invention will be described with reference to the accompanying drawings.

Figure 1:
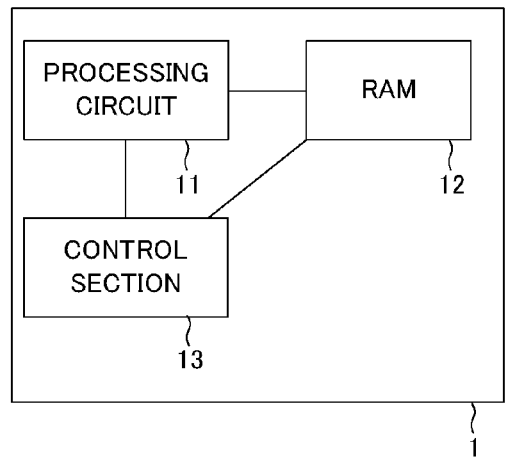
FIG. 1 is a diagram illustrating the configuration of an integrated circuit according to an embodiment of the present invention.

The configuration of an integrated circuit of the present embodiment will be described. FIG. 1 illustrates the configuration of the integrated circuit according to the present embodiment.

As illustrated in FIG. 1, the integrated circuit 1 of the present embodiment includes a processing circuit 11, a RAM 12 (memory), and a control section 13 (memory control device). The processing circuit 11 performs predetermined processes using the RAM 12. The RAM 12 temporarily stores data of the predetermined processes by the processing circuit 11. The control section 13 carries out first-in first-out access control for the RAM 12.

Figure 2:
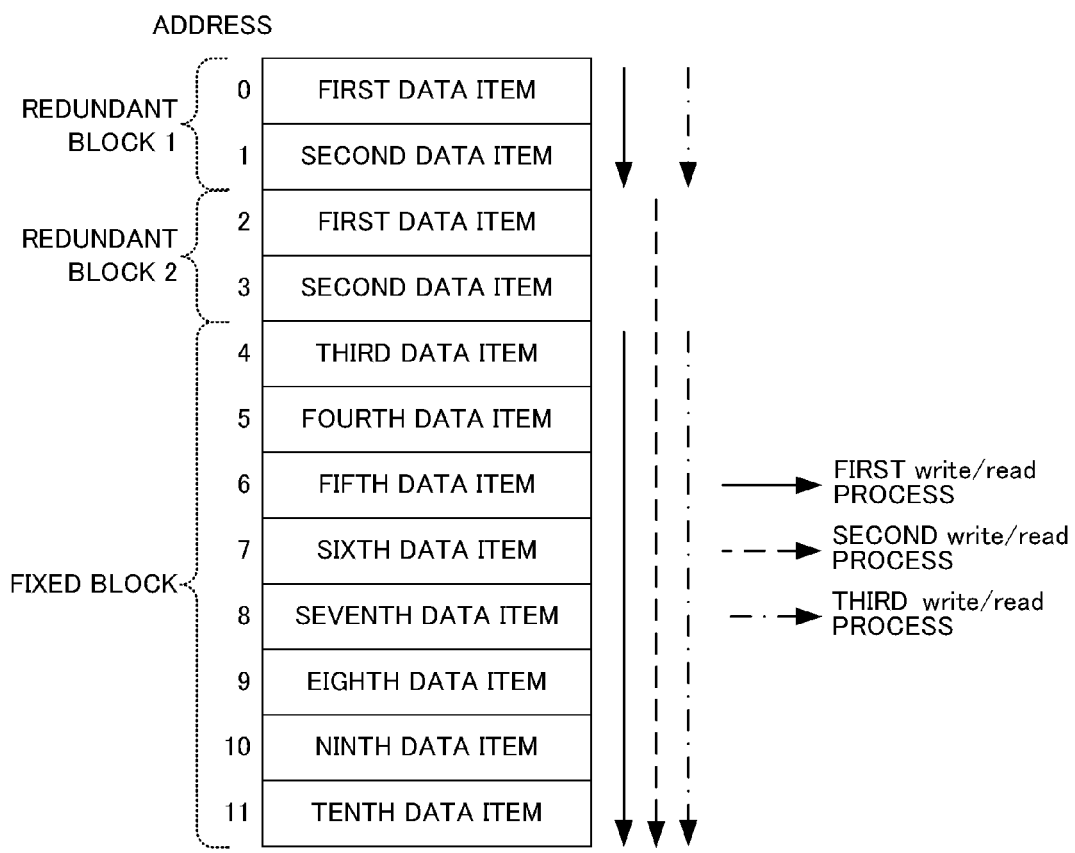
FIG. 2 is a diagram schematically illustrating the configuration of a RAM and access control.

The following describes the schematic configuration of the RAM as well as the access control. FIG. 2 illustrates the schematic configuration of the RAM as well as the access control.

As illustrated in FIG. 2, the RAM 12 includes storage areas indicated by addresses 0 to 11, each storage area having a capacity of 10 bits. In the RAM 12, the addresses 0 and 1 that serve as a redundant block 1, the addresses 2 and 3 that serve as a redundant block 2, and the addresses 4 to 11 that serve as a fixed block are under the control of the control section 13. The switch between the redundant blocks 1 and 2 occurs each time one process of writing and reading is completed. The redundant blocks 1 and 2 are blocks to which a first and a second data items are written and from which the data items are read. The fixed block is a block to which a third to a tenth data items are written.

In the RAM 12, first, the first and second data items are written to the redundant block 1; the third to tenth data items are written to the fixed block. After the written data items are read, the redundant block 2 is used instead of the redundant block 1; the first and second data items are written to the redundant block 2 and the third to tenth data items are written to the fixed block. Incidentally, the redundant block may not have two storage areas: Each redundant block has at least one block and the same number of storage areas. It is preferable that there are a plurality of redundant blocks. The redundant blocks may be positioned anywhere on the addresses of the RAM. However, it is desirable that the redundant blocks are so arranged as to be in the beginning or ending addresses of the RAM 12, i.e. the successive addresses in either end of the RAM.

Figure 3:
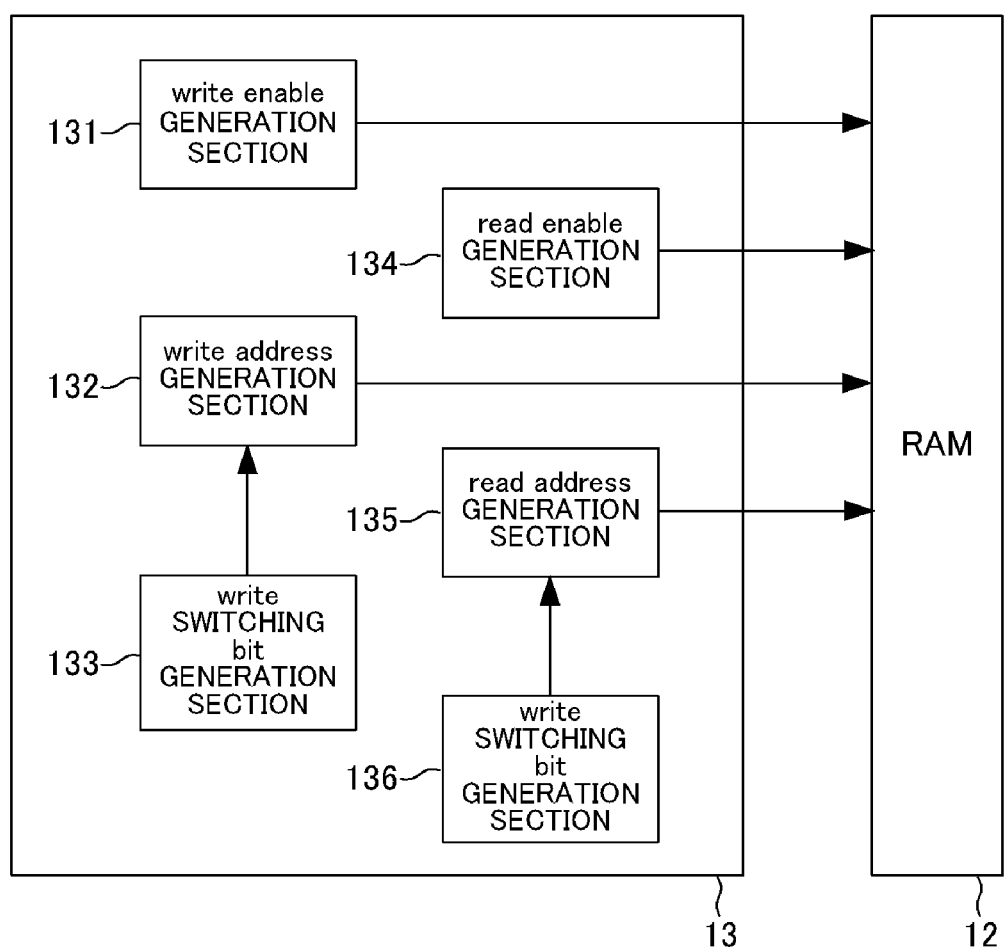
FIG. 3 is a diagram illustrating the configuration of a control section.

The following describes the configuration of the control section. FIG. 3 illustrates the configuration of the control section.

As illustrated in FIG. 3, the control section 13 includes a write enable generation section 131, a write address generation section 132 (write position selection section), a write switching bit generation section 133 (write position selection section), a read enable generation section 134, a read address generation section 135 (read position selection section), and a read switching bit generation section 136 (read position selection section).

The write enable generation section 131 generates a 1-bit "write enable" for the RAM 12. The write address generation section 132 generates a 4-bit write address as a write pointer for the RAM 12. The write switching bit generation section 133 generates a write switching bit to alternately use the redundant blocks 1 and 2 when data is written to the RAM 12. The read enable generation section 134 generates a 1-bit "read enable" for the RAM 12. The read address generation section 135 generates a 4-bit read address as a read pointer for the RAM 12. The read switching bit generation section 136 generates a read switching bit to alternately use the redundant blocks 1 and 2 when data is read from the RAM 12. Incidentally, during a process of writing data, the redundant block 1 is used when the write switching bit is 0; the redundant block 2 is used when the write switching bit is 1. During a process of reading data, the redundant block 1 is used when the read switching bit is 0; the redundant block 2 is used when the read switching bit is 1. The read switching bit generation section 136 generates a read switching bit that enables the redundant block used in the process of writing data to be used in the process of reading data.

Figure 4:
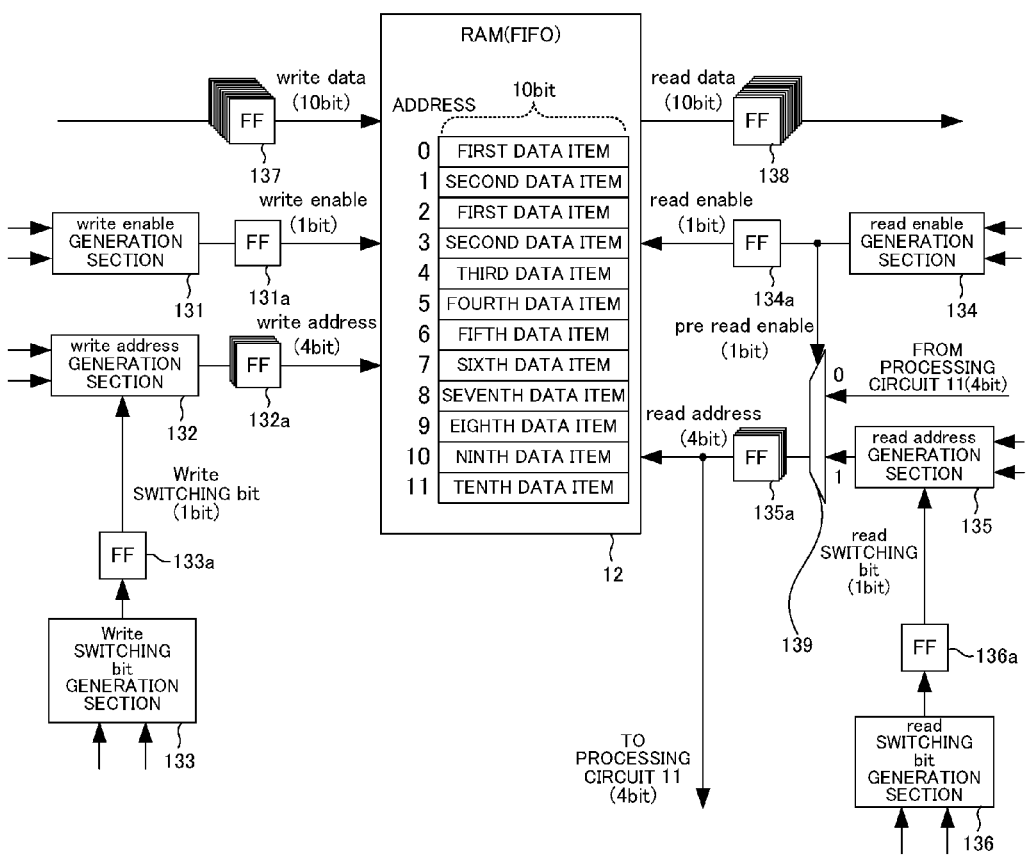
FIG. 4 is a diagram illustrating the configuration of the RAM and the control section.

The following describes the configuration of the RAM and the control section. FIG. 4 illustrates the configuration of the RAM and the control section.

As illustrated in FIG. 4, between the write enable generation section 131 and the RAM 12, a 1-bit flip-flop 131*a* is provided to temporarily hold the "write enable." Between the write address generation section 132 and the RAM 12, a 4-bit flip-flop 132*a* is provided to temporarily hold the write address. Between the write switching bit generation section 133 and the write address generation section 132, a 1-bit flip-flop 133*a* is provided to temporarily hold the write switching bit. Between the read enable generation section 134 and the RAM 12, a 1-bit flip-flop 134*a* is provided to temporarily hold the "read enable." Between the read address generation section 135 and the RAM 12, a 4-bit flip-flop 135*a* is provided to temporarily hold the read address. Between the read switching bit generation section 136 and the read address generation section 135, a flip-flop 136*a* is provided to temporarily hold the read switching bit. On an input path that inputs write data to the RAM 12, a 10-bit flip flop 137 is provided to temporarily hold write data that is written to the RAM 12. On an output path that outputs read data from the RAM 12, a 10-bit flip flop 138 is provided to temporarily hold read data that is read from the RAM 12.

Between the read address generation section 135 and the flip-flop 135*a*, a selector 139 is provided. The selector 139 selects signals from the read address generation section 135 after receiving "pre read enable" from the read enable generation section 134. When the selector 139 does not receive the "pre read enable," the selector 139 selects signals from the processing circuit 11. Suppose that the signals from the processing circuit 11 are a 4-bit data. The signals from the flip-flop 135*a* are output to the RAM 12 and the processing circuit 11.

Figure 5:
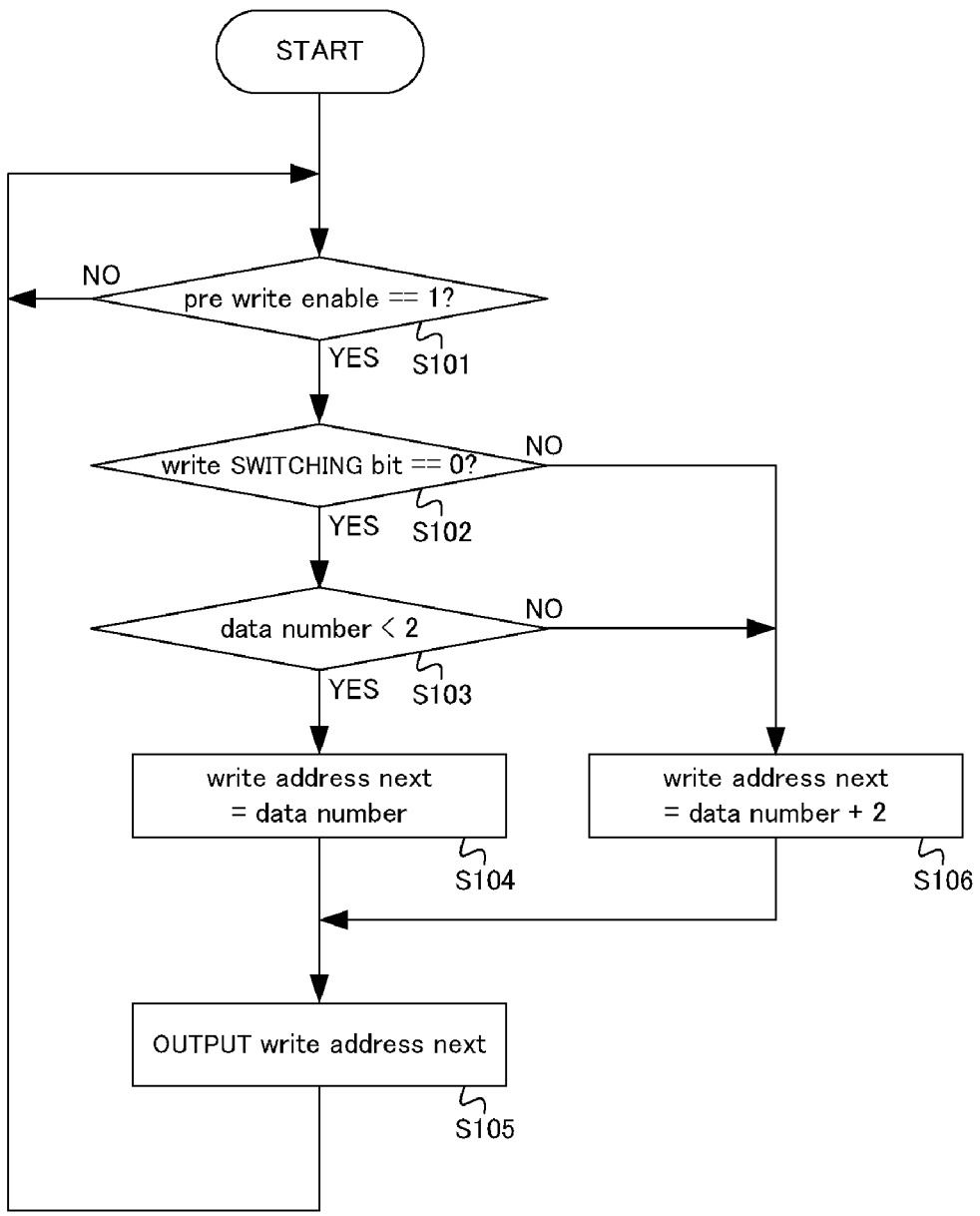
FIG. 5 is a diagram illustrating the operation of a write address generation section.

The following describes the operation of the write address generation section. FIG. 5 illustrates the operation of the write address generation section.

As illustrated in FIG. 5, first, the write address generation section 132 makes a determination as to whether "pre write enable," which is the "write enable" that has yet to be input into the flip-flop 131*a*, is 1 (S101).

When the "pre write enable" is 1 (S101, YES), the write address generation section 132 makes a determination as to whether the write switching bit is 0 (S102).

When the write switching bit is 0 (S102, YES), the write address generation section 132 makes a determination as to whether a data number that indicates the order of data items to be written to the RAM 12 is less than 2 (S103). Incidentally, the initial data of the data number is 0; the data number falls in the range of 0 to 9.

When the data number is less than 2 (S103, YES), the write address generation section 132 assigns the value of the data number to "write address next," a write address that has yet to be input to the flip-flop 132*a* (S104). Then, the write address generation section 132 outputs the "write address next" (S105) and makes a determination again as to whether the "pre write enable" is 1 (S101).

On the other hand, when the data number is not less than 2 (S103, NO), the write address generation section 132 assigns the value obtained by adding the value of the data number and 2 to the "write address next" (S106). The write address generation section 132 then outputs the "write address next" (S105) and makes a determination again as to whether the "pre write enable" is 1 (S101).

When the write switching bit is not 0 at step S102 (S102, NO), the write address generation section 132 assigns the value obtained by adding the value of the data number and 2 to the "write address next" (S106).

When the "pre write enable" is not 1 at step S101 (S101, NO), the write address generation section 132 makes a determination again as to whether the "pre write enable" is 1 (S101).

Figure 6:
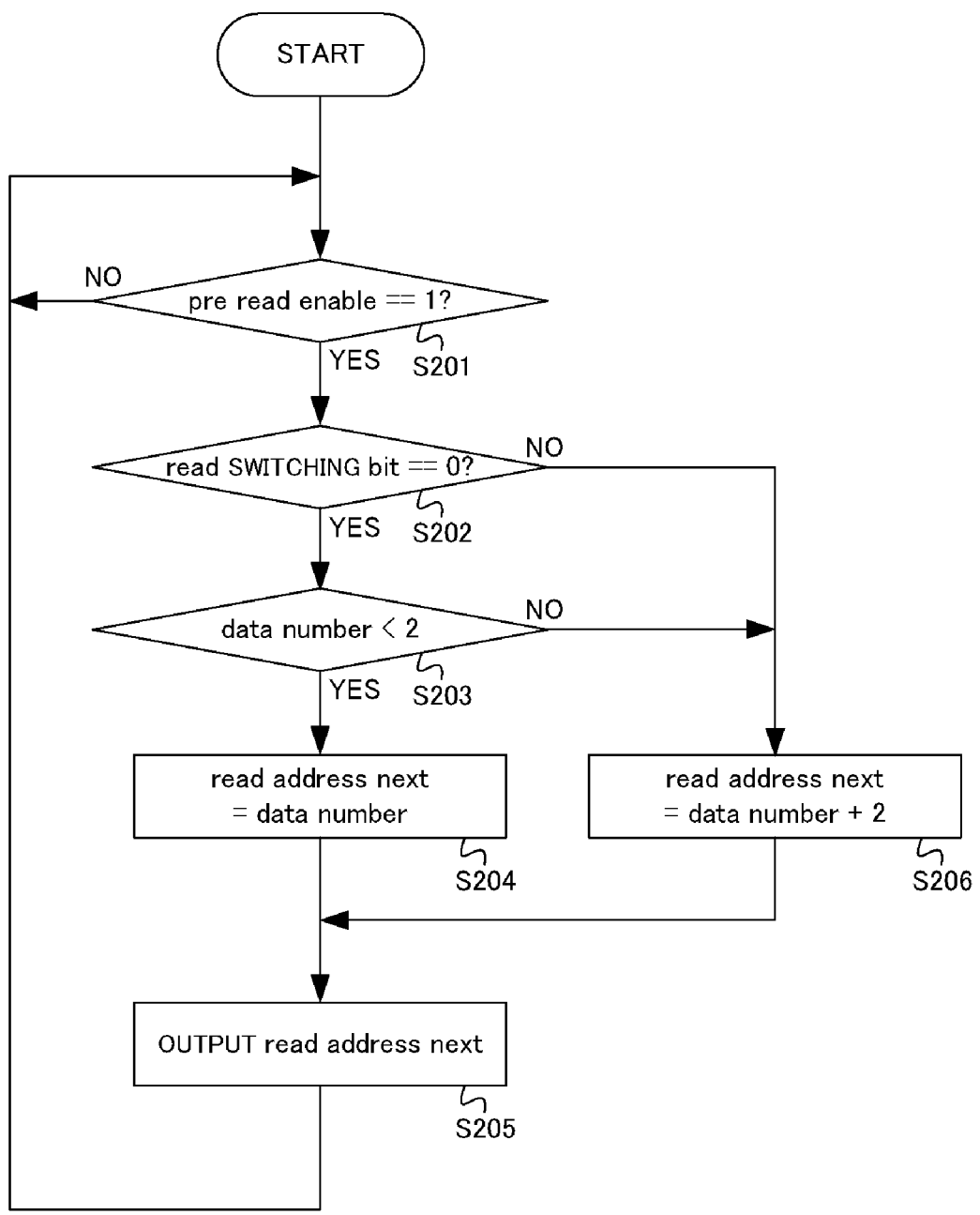
FIG. 6 is a diagram illustrating the operation of a read address generation section.

The following describes the operation of the read address generation section. FIG. 6 illustrates the operation of the read address generation section.

As illustrated in FIG. 6, the read address generation section 135 makes a determination as to whether "pre read enable," which is the "read enable" that has yet to be input to the flip-flop 134*a*, is 1 (S201).

When the "pre read enable" is 1 (S201, YES), the read address generation section 135 makes a determination as to whether the read switching bit is 0 (S202).

When the read switching bit is 0 (S202, YES), the read address generation section 135 makes a determination as to whether the data number that indicates the order of data items to be written to the RAM 12 is less than 2 (S203).

When the data number is less than 2 (S203, YES), the read address generation section 135 assigns the value of the data number to "read address next," a read address that has yet to be input to the flip-flop 135*a* (S204). Then, the read address generation section 135 outputs the "read address next" (S205) and makes a determination again as to whether the "pre read enable" is 1 (S201).

On the other hand, when the data number is not less than 2 (S203, NO), the read address generation section 135 assigns the value obtained by adding the value of the data number and 2 to the "read address next" (S206). The read address generation section 135 then outputs the "read address next" (S205) and makes a determination again as to whether the "pre read enable" is 1 (S201).

When the read switching bit is not 0 at step S202 (S202, NO), the read address generation section 135 assigns the value obtained by adding the value of the data number and 2 to the "read address next" (S206).

When the "pre read enable" is not 1 at step S201 (S201, NO), the read address generation section 135 makes a determination again as to whether the "pre read enable" is 1 (S201).

As described above, as opposed to the fixed block, a plurality of redundant blocks are alternately used. Therefore, the readable period is extended by an amount equivalent to the number of addresses made redundant; the RAM's addresses are correlated with the order of data access. Moreover, the redundant blocks are successively arranged so as to be in the beginning or ending addresses of the RAM. Therefore, the stages of process by the write address generation section 132 and the read address generation section 135 may be reduced. That is, as circuits, the write address generation section 132 and the read address generation section 135 may be made small in size.

Figure 7:
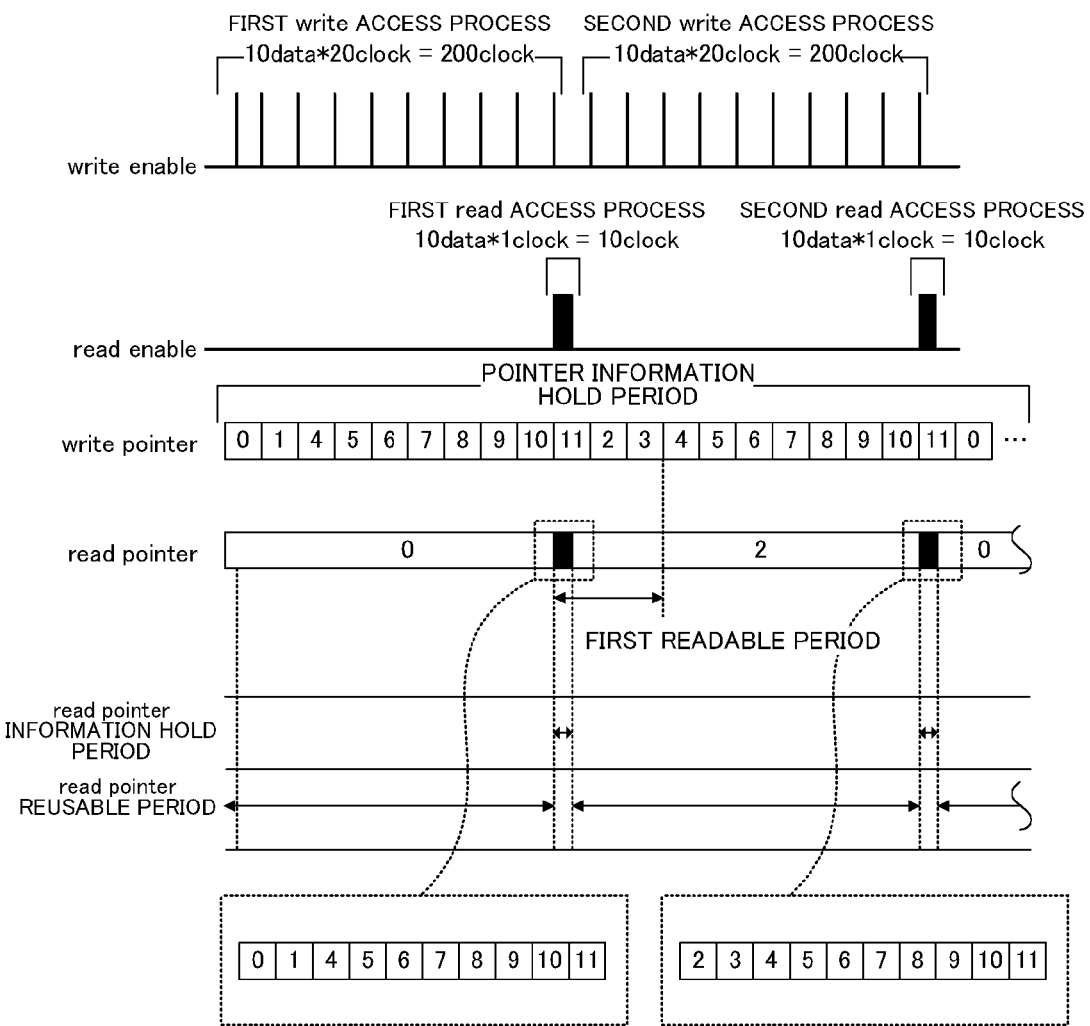
FIG. 7 is a diagram illustrating control timings of the RAM by the control section.
Figure 8:
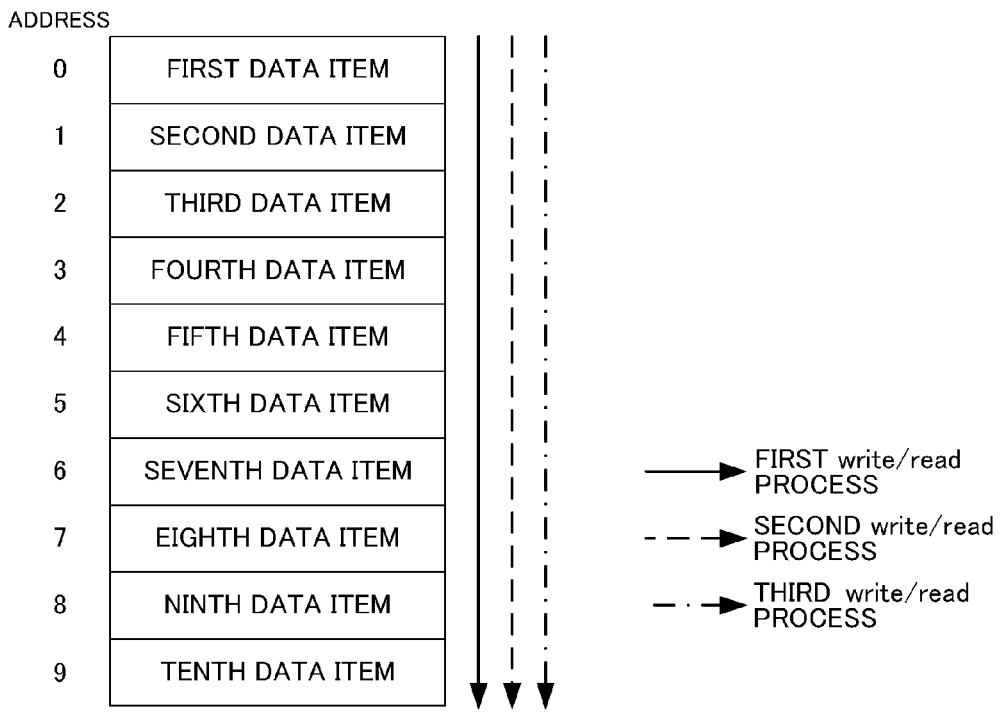
FIG. 8 is a diagram schematically illustrating FIFO access control.
Figure 9:
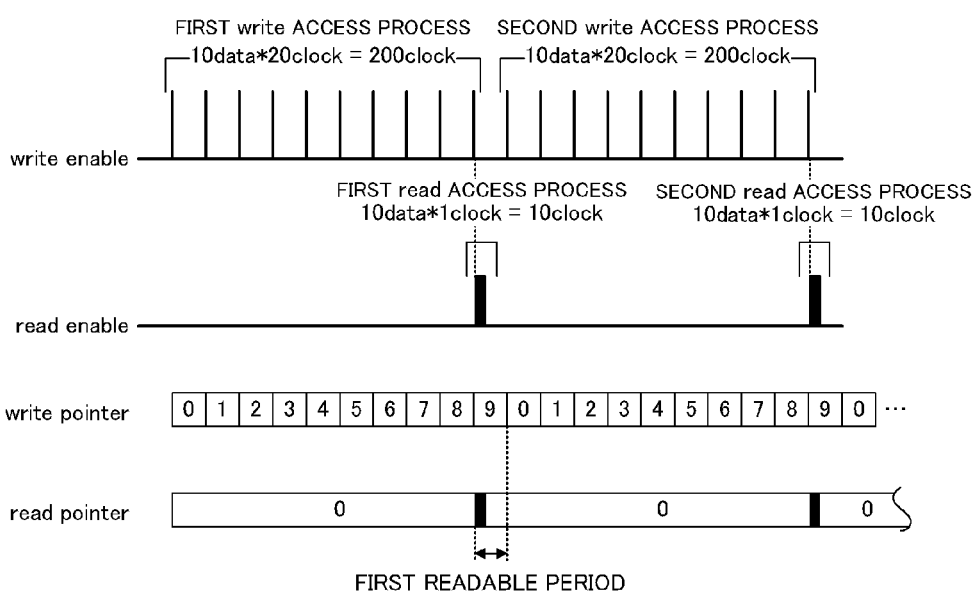
FIG. 9 is a diagram illustrating control timings for a conventional RAM.
Figure 10:
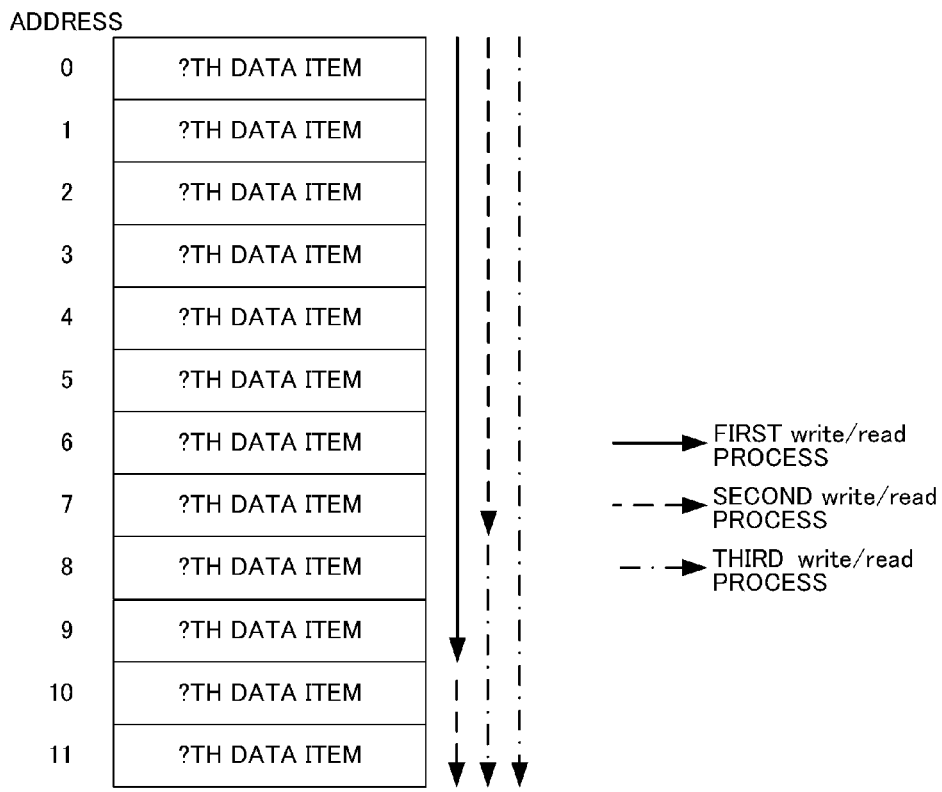
FIG. 10 is a diagram schematically illustrating access control with parts of RAM's addresses used as redundant blocks.
Figure 11:
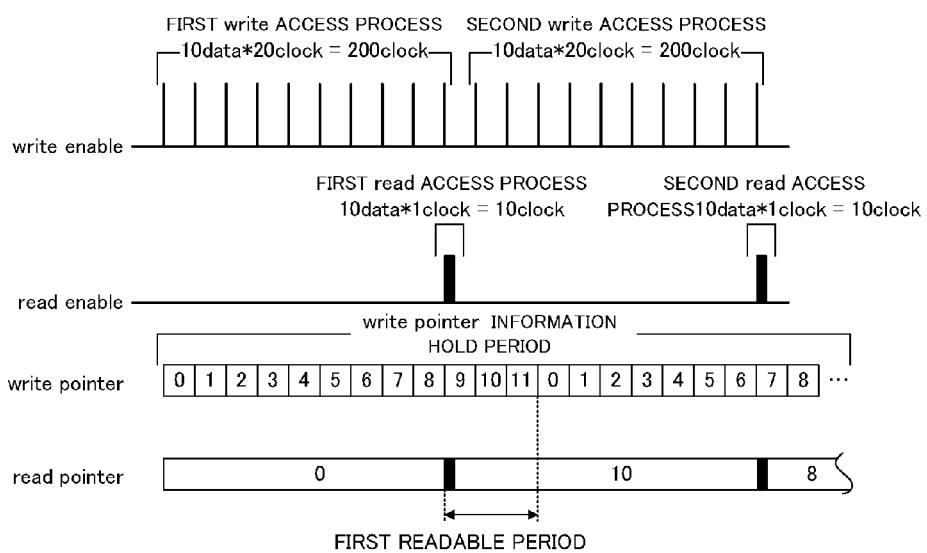
FIG. 11 is a diagram illustrating access control timings when parts of RAM's addresses are used as redundant blocks.
Figure 12:
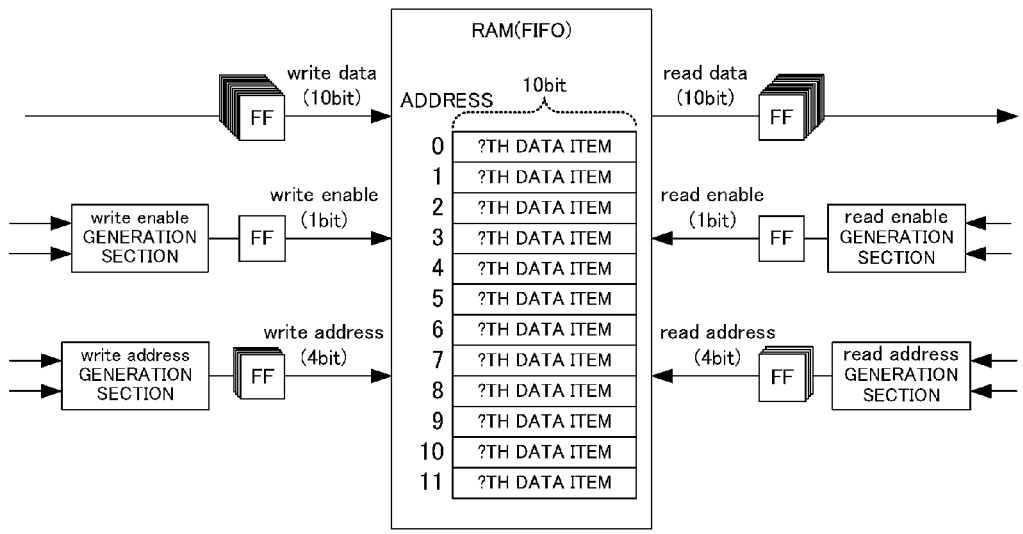
FIG. 12 is a diagram illustrating a control configuration for a RAM where parts of addresses are used as redundant blocks.
Figure 13:
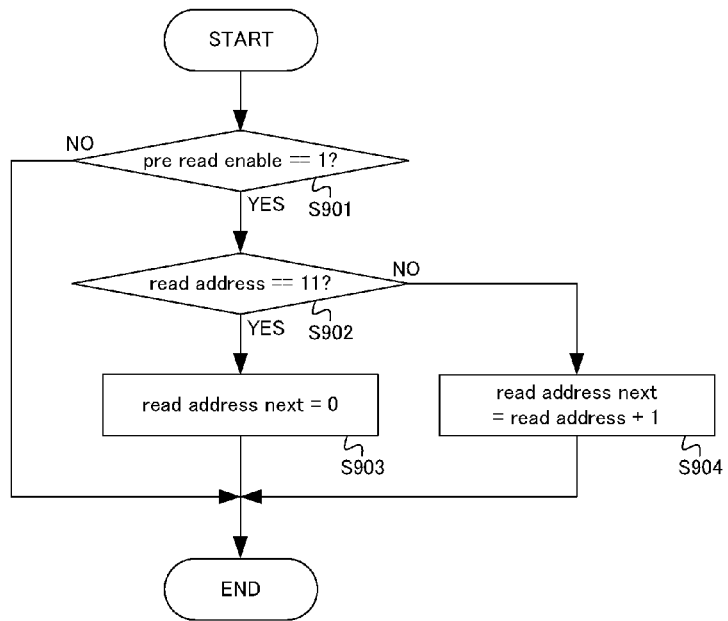
FIG. 13 is a diagram illustrating the operation of a conventional read address generation section.

The following describes a hold time of the read pointer according to the present embodiment. FIG. 7 illustrates control timings of the RAM by the control section.

Thanks to the above correlation between the RAM's addresses and the order of access, the read address generation section 135 may determine the "read address next" based on the read switching bit and the data number. That is, since the read address generation section 135 may determine the "read address next" without relying on the read address, it is not necessary for the flip-flop 135a to continuously hold the read address. As illustrated in FIG. 7, the flip-flop 135a holds the read address as the read pointer only during the period when data is read. That is, the reuse of the flip-flop 135a by another kind of logic is possible even when data is not read.

Incidentally, as illustrated in FIG. 7, according to the present embodiment, the "write enable" is output by the write enable generation section 131 ten times at intervals of 20 clocks for one write access process. The "read enable" is generated by the read enable generation section 134 by the time when the write pointer points to the fixed block during a period from a given write access process until the next write access process. The "read enable" is output ten times at intervals of 1 clock for one read access process. That is, the read access process is locally performed during a period that is less than or equal to that of one write access process.

In the integrated circuit, flip-flops are relatively expensive. Therefore, the use of the flip-flop 135a for another kind of logic as well as for the original purpose helps to reduce costs. Moreover, as the number of the RAM's addresses increases, so does the number of bits of the flip-flop 135a; the use of the flip-flop 135a for another kind of logic as well as for the original purpose reduces the size of the circuit.

Moreover, according to high-level design such as FPGA (Field Programmable Gate Array), the number of flip-flops is determined in advance in an integrated circuit whose internal logic may be changed. Furthermore, according to the high-level design, the logic generated by a hardware description language is optimized as a circuit. For example, as the optimization of circuit, for different kinds of logic which have different timings in using a flip-flop, the same flip-flop is automatically allocated. Therefore, according to the present invention, in the integrated circuit for high-level design, a limited number of flip-flops may be used efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A memory control method that carries out first-in first-out access control for a memory having a plurality of storage areas, comprising:
    selecting, as write positions, an address of a storage area in a storage block having at least one or more storage areas and an address of a storage area in any one of a plurality of redundant blocks that are made redundant with respect to the storage block and have at least one or more storage areas when the write positions are selected to write data to the memory; and
    selecting, as read positions, an address of a storage area of the storage block and an address selected by the selecting of the write position from among the addresses of a plurality of the redundant blocks when the read positions are selected to read data written by the writing of the data to the memory, wherein
    the switch between the redundant blocks for including the address selected as the write position occurs each time the data is written.

2. The memory control method according to claim 1, wherein
    a plurality of the redundant blocks have the same number of storage areas.

3. The memory control method according to claim 1, wherein
    a plurality of the redundant blocks are so disposed as to have successive addresses of storage areas in the redundant blocks.

4. The memory control method according to claim 3, wherein
    a plurality of the redundant blocks are disposed in an end portion of the memory.

5. A memory control device that carries out first-in first-out access control for a memory having a plurality of storage areas, comprising:
    a write position selection section that selects, as write positions, an address of a storage area in a storage block having at least one or more storage areas and an address of a storage area in any one of a plurality of redundant blocks that are made redundant with respect to the storage block and have at least one or more storage areas out of the storage areas of the memory when data is written to the memory; and
    a read position selection section that selects, as read positions, an address of a storage area of the storage block and an address selected by the write position selection section from among the addresses of a plurality of the redundant blocks when data written by the writing of the data to the memory is read, wherein
    the switch between the redundant blocks for including the address selected as the write position occurs each time the data is written.

6. The memory control device according to claim 5, wherein
    a plurality of the redundant blocks have the same number of storage areas.

7. The memory control device according to claim 5, wherein
    a plurality of the redundant blocks are so disposed as to have successive addresses of storage areas in the redundant blocks.

8. The memory control device according to claim 7, wherein
    a plurality of the redundant blocks are disposed in an end portion of the memory.

* * * * *